United States Patent

[11] 3,627,393

[72] Inventors: Paul Laurence Durham Hickson, Welwyn Garden City; David Alexander Lindsay Seiler, Chorley Wood, both of England
[21] Appl. No.: 23,778
[22] Filed: Mar. 30, 1970
[45] Patented: Dec. 14, 1971
[73] Assignees: Imperial Chemical Industries Limited, London,; The Flour Milling and Baking Research Association, Chorley Wood, England
[32] Priority: Apr. 1, 1969
[33] Great Britain
[31] 17,033/69

[54] CONTAINERS
10 Claims, 4 Drawing Figs.

[52] U.S. Cl. .................................................. 312/31.1, 220/97 R
[51] Int. Cl. .................................................. A24f 25/00
[50] Field of Search .................................................. 312/31.1; 220/23.8, 97 R

[56] References Cited
UNITED STATES PATENTS

| | | | |
|---|---|---|---|
| 1,463,360 | 7/1923 | Foote | 220/23.83 X |
| 1,673,711 | 6/1928 | Richeson | 312/42 |
| 3,331,529 | 7/1967 | Slapnik | 220/97 |
| 3,401,993 | 9/1968 | Fenkel | 220/97 X |
| 3,424,334 | 1/1969 | Goltz | 220/97 X |

Primary Examiner—James C. Mitchell
Attorney—Cushman, Darby & Cushman

ABSTRACT: A container for perishable foodstuffs, e.g. bread, confectionery, meat and meat products, fruit and vegetables, has upstanding sidewalls and a perforated base section, means being provided at the top and bottom of the sidewalls whereby a number of containers can nest one within the other, a gasket being provided around either the top or bottom of the sidewalls to provide sealing between two adjacent containers. By placing solid carbon dioxide into the top of a stack of these containers, or introducing some other preserving atmosphere into the stack, the shelf life of foodstuffs can be increased.

PATENTED DEC 14 1971

INVENTORS
PAUL LAURENCE DURHAM HICKSON
DAVID ALEXANDER LINDSAY SEILER

BY
Cushman, Darby & Cushman
ATTORNEYS

CONTAINERS

The present invention relates to containers and in particular to containers for perishable foodstuffs including meat and meat products, fruit and vegetables, and particularly bread and confectioneries.

Many foodstuffs are perishable and susceptible to the formation of mould. Furthermore, in large bakeries considerable quantities of bread and pastries may be produced in a short time and delays of in excess of a week can occur before these foodstuffs are distributed from the warehouses to the shops for sale to the public. Similar delays can also occur in the distribution of sausages, meat, including fish and poultry, fruit and vegetables. Due to these delays in distribution to the public, the foodstuffs can deteriorate due to mould formation or bacterial action with a consequent waste of food.

According to the present invention there is provided a container suitable for foodstuffs wherein said container has upstanding unperforated sidewalls and a perforated base section, nesting means being provided at the top and bottom of the sidewalls whereby the container is nestable with a similar container, and a sealing ring being provided at the top or bottom of the sidewalls in association with one of the said nesting means.

The container may be formed of a wide range of materials and for ease of production is conveniently formed of a thermoplastic material. When formed of a thermoplastic material the container is readily produced in a single moulding operation whereby the perforated base section is integral with the sidewalls and the nesting means. The sealing ring is secured into position in a separate step subsequent to the forming of the container.

The container can be formed of a solid thermoplastic or, primarily for the purposes of heat insulation as set out in more detail hereafter, the sidewalls can be formed of a foamed thermoplastic material. For convenience of production the perforated base section can also be formed of a foamed material.

Suitable thermoplastic materials for the production of the container are polymers and copolymers of ethylene, propylene, styrene and vinyl chloride. Preferably the thermoplastic material should have good impact properties to allow for mishandling in use and also should be able to withstand the high temperatures used in washing or sterilizing the container, without any large deformation of the container occurring. Copolymers of propylene with ethylene are particularly suitable since these materials combine good impact properties with resistance to deformation at washing or sterilizing temperature (80°–100° C.).

The nesting means may be any of the known means used to provide nesting of containers. A particularly suitable nesting means comprises an upstanding tongue around the top of the sidewalls, with a corresponding groove formed in the base of the sidewalls into which the tongue on the top of the next lower container in the stack would fit. In such an arrangement, the sealing ring would be located in the groove whereby an essentially gastight seal would be obtained between the adjacent containers in the stacks.

It will be appreciated that the tongue and groove can be located at the bottom and top respectively of the sidewalls, but in such a position the tongue is liable to be deformed, or broken, in use by dropping onto the floor and this would destroy the nesting and sealing properties of the containers.

In an alternative arrangement the groove can be located at the base of the container, and the sidewalls can be extended below the perforated base as a skirt of increased diameter which fits over the top of the next lower container in the pile, the top of such lower container fitting into the groove in the upper container. The sealing ring in this arrangement is preferably located in the groove in the base of the container. The sealing ring is located in a position to give the maximum sealing effect and in general this effect is best attained by locating the sealing ring in a recess or groove into which fits a corresponding extension on the adjacent container. The sealing ring can be made of any suitable compressible material and is preferably formed of a flexible foamed material such as, for example, a foamed rubber, a polyether foam or a polyurethane foam.

Using containers as described herein, it is possible to form a stack of containers which are sealed against the leakage of a gaseous atmosphere into, or out of, the stack. This effect is particularly important for perishable foodstuffs since it permits an atmosphere of a preserving gas, such as carbon dioxide, to be maintained within the stack while the food is being stored in the warehouse or transported to distribution points. An atmosphere of carbon dioxide is readily obtained in the stack by introducing solid carbon dioxide into the stack, whereby, as the solid evaporates to form gaseous carbon dioxide, the air originally present in the stack is forced out by the carbon dioxide and an atmosphere of carbon dioxide established within the stack. Alternatively, the stack can be flushed with carbon dioxide or other preserving gas under pressure. An atmosphere containing carbon dioxide created will delay the onset of deterioration of foodstuffs in the containers of the stack. To obtain the best effect, the stack of containers is sealed at the top and bottom by the use of suitable unperforated top and bottom caps. A suitably designed cap may be effective as either a top or bottom cap. The whole stack, or if desired, a number of stacks may be held together as an essentially leakproof assembly, by a number of straps, typically two or three, around the containers and the end caps, thus providing a stack or stacks of containers in which an atmosphere containing carbon dioxide is maintained and which can be transported as a complete unit.

Using solid carbon dioxide, in addition to the carbon dioxide gas acting as a preserving atmosphere, the cold gas emitted from the solid carbon dioxide also acts as a refrigerant, and this also delays the deterioration of the food. In order to obtain the greatest refrigerant effect, it is necessary that the material of the containers, or at least the sidewalls thereof, should have a low thermal conductivity, and this can be achieved by the use of foamed material. The use of foamed materials also has the advantage of providing a light, rigid construction. Furthermore, the use of foamed materials provides a stack of containers which have good insulating properties and which are effective not just to retain the cold resulting from the solid carbon dioxide, but also to reduce loss of heat (in the absence of solid carbon dioxide) from an object at an elevated temperature, for example warm bread.

The solid carbon dioxide may be introduced at any point in the stack but we have found that equilibrium conditions are most rapidly attained if the solid carbon dioxide is introduced into the top of the stack.

The solid carbon dioxide is preferably retained in a cage structure which is a snap clip-on fit fixed to the top cap of the stack. The cage can conveniently have a solid base, to prevent small pieces of the solid carbon dioxide and condensate falling through the stack, and perforated sidewalls to allow the ready and rapid escape of the carbon dioxide gas evolved. The rate of gas release can be varied according to the material used for the cage, for example with a metal or solid thermoplastic cage the gas is evolved more rapidly than from a similar cage formed from a foamed thermoplastic.

In order to more fully describe the present invention, reference will now be made to the accompanying drawings wherein.

Figure 1:
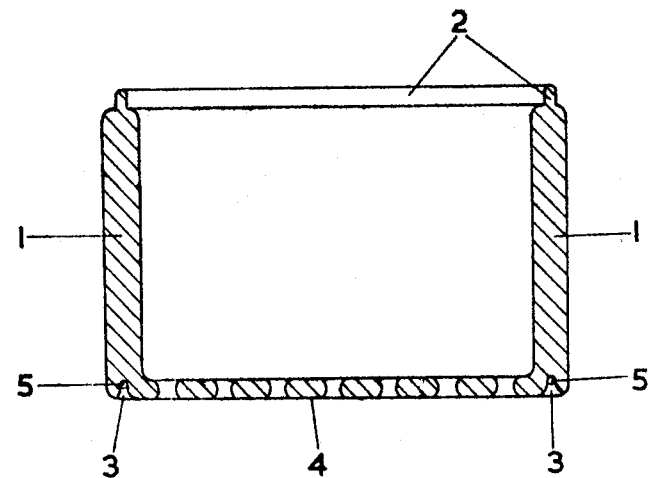
FIG. 1 is a sectional view through a container in accordance with the invention.

FIG. 1 shows a simple structure of container comprising sidewalls 1, a tongue 2 running round the top surface of the walls 1, and a groove 3 formed at the bottom of the walls 1. The container has a perforated base section 4. In the groove 3 is located a foam rubber sealing ring 5. The stacking of these containers is described in more detail hereafter in respect to FIG. 4.

Figure 2:
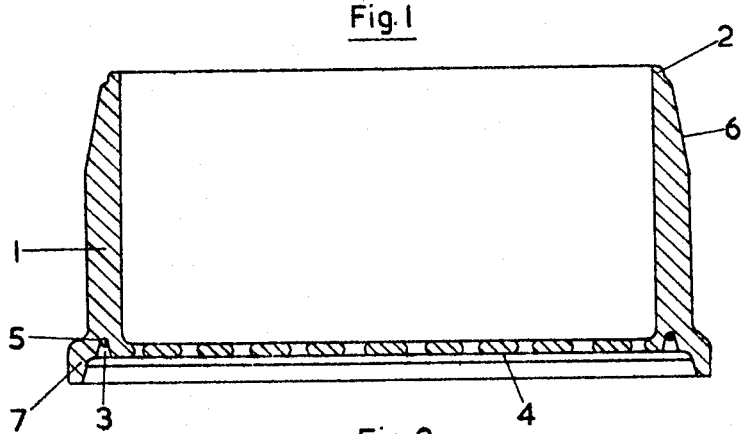
FIG. 2 is a sectional view through an alternative container in accordance with the invention.

In the container shown in FIG. 2, the upper section of the walls 1, is tapered inwardly as shown at 6. The sidewalls 1 are extended downwardly by a skirt 7. The skirt 7 is shaped internally to fit over the taper 6 and the tongue 2 forming the upper portion of a further similar container located beneath that described. The tongue 2 of this lower container fits into the groove 3 and, in conjunction with the sealing ring 5 forms an essentially leakproof seal between the adjacent containers.

Figure 3:
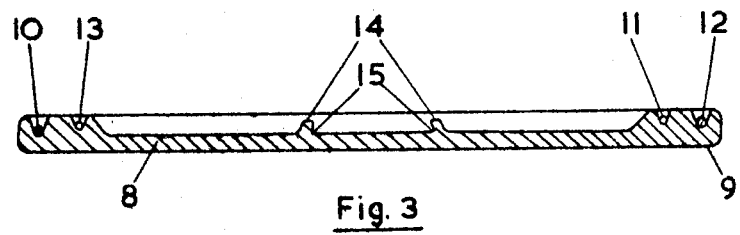
FIG. 3 is a sectional view through an end cap for use with the container in FIG. 2.

In FIG. 3 is shown an end cap which can fit either at the top or bottom of the container shown in FIG. 2. The end cap comprises a central disc 8, having a perimeter region 9 of increased thickness. A wide outer groove 10 and a narrower inner groove 11 are formed in the region 9, both of the grooves 10 and 11 running round the end cap. In each of the grooves 10 and 11 is located a sealing ring 12 and 13 respectively. At the center of the disc 8 are formed two ribs 14, each of which is provided with a groove 15 at its base whereby a cage (not shown) for holding solid carbon dioxide, can be clipped and held in position by means of a flange at the top of the cage fitting into the grooves 15. When used as a bottom cap, the skirt 7 fits into the wide grooves and forms a seal with the sealing ring 12. When used as a top cap, a cage containing solid carbon dioxide is held by the grooves 15 in the ribs 14, and the tongue 2 fits into the inner groove 11 and forms a seal with the sealing ring 13.

Figure 4:
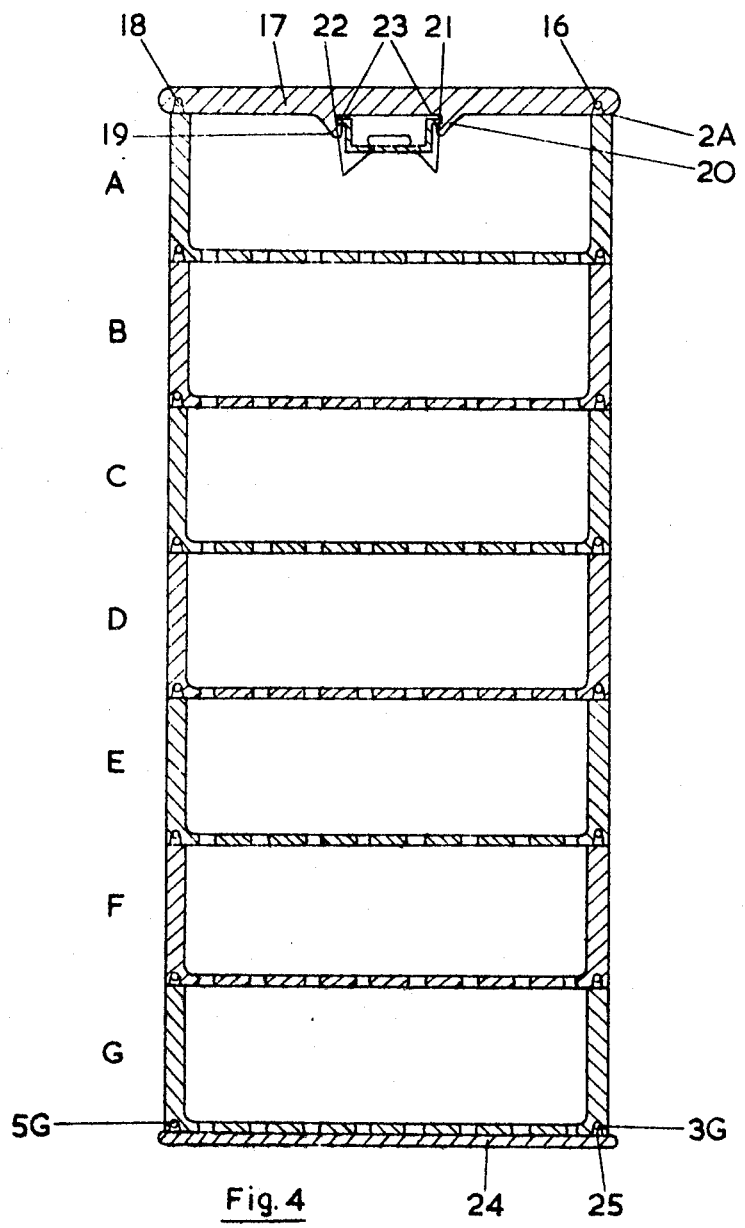
FIG. 4 is a sectional view through a stack of containers in accordance with the invention.

FIG. 4 shows a sealed stack of the containers shown in FIG. 1. For convenience the containers will be referred to, from top to bottom, as containers A to G respectively, and corresponding parts will be identified by the appropriate combination of letter and number. The tongues 2A of the container A, fit into the groove 16 in the top cap 17, the groove 16 containing a sealing ring 18 to give a leakproof seal between container A and the top cap 17. In the under surface of the top cap 17 are formed a pair of ribs 19 which are recessed at 20, a cage 21 which contains solid carbon dioxide 22 being held in position by flanges 23 at the top of the cage 21 which clip into the recesses 20. A bottom cap 24 is provided with a tongue 25 near the perimeter thereof, and the tongue 25 forms a seal with the sealing ring 5G in the groove 3G of the container G. The containers A to G nest together and form seals one with the other as a result of the tongues 2 of the containers fitting into the grooves 3 of the container above and forming a seal with the sealing ring 5. The whole stack shown in FIG. 4 is held secure by straps, for example, of polypropylene, passing round the stack (these straps are not shown). If desired the containers may be formed with channels in which the straps may be positioned, or, alternatively, a slot may be formed on the surface of the container, the strap being passed through the slot in each container. The containers A to G can contain perishable foodstuffs such as, for example, bread, pastries and other confectionery, these foodstuffs being maintained in an atmosphere rich in carbon dioxide until the stack is broken up and the containers separated.

The use of solid carbon dioxide not only provides an atmosphere of carbon dioxide but also gives a short or long term refrigerant effect, dependent on the material used, to preserve the foodstuffs. The atmosphere of carbon dioxide once established in the stack is maintained for a period of a week or more, without it being necessary to introduce a further quantity of solid carbon dioxide. The atmosphere of carbon dioxide is unlikely to be maintained indefinitely however, and, over a period of time, the carbon dioxide can leak away slowly and be lost.

As an alternative to using solid carbon dioxide as a source of the preserving atmosphere, the stack can be flushed from time to time, typically every 12 or 24 hours, with a suitable gas. This technique is particularly useful in the preservation of fruit since many fruits are injured by a carbon dioxide rich atmosphere and it is possible to flush with a gas mixture which will not damage the fruit, for example nitrogen containing 5–7 percent of carbon dioxide.

The following examples illustrate the use of a stack of containers in accordance with the present invention to maintain an atmosphere of carbon dioxide and also the effectiveness of this atmosphere in preventing deterioration of foodstuffs.

Eight stacking polypropylene containers with internal measurements of 38.1×25.4×14.0 cm. were used in these examples. All the containers were fitted with a foam rubber gasket round the top rim. Two containers had a solid base and the remainder had a perforated base. In the various examples, the containers with a solid base were placed at the top and the bottom of the stack and 12.7 kg. were placed on the top perforated container. The internal capacity of the stack of containers was approximately 100 litres. Samples of gas were removed for analysis by piercing a hypodermic needle through a rubber patch covering a hole bored at the side of each container.

Six tests were carried out which are described separately below in the examples.

EXAMPLE 1

A piece of solid carbon dioxide weighing approximately 450 g. was placed on the bottom container and readings of the amount of carbon dioxide present in the containers throughout the stack taken at regular intervals. The results obtained are shown below in table 1.

TABLE 1

| Container no. | % $CO_2$ in container after storage at ambient for (h) | | | | |
|---|---|---|---|---|---|
| | 2 | 19 | 23 | 27 | 42 |
| Top  1 | 0 | 53 | 45 | 41 | 27 |
| 2 | — | — | 50 | 44 | 27 |
| 3 | — | — | 54 | 46 | 27 |
| 4 | 65 | 70 | 58 | 50 | 27 |
| 5 | — | — | 60 | 52 | 27 |
| 6 | — | — | 63 | 53 | 27 |
| Base  7 | 93 | 83 | 66 | 54 | 27 |

It is apparent that the carbon dioxide concentration throughout the stack took a long time to reach equilibrium, i.e. about 27 hours, and, after this period, only about 50 percent of the gas was present which reduced to 27 percent after storage for 42 hours.

EXAMPLE 2

A piece of solid carbon dioxide weighing approximately 450 g. was placed in the top perforated container in the stack and readings of the carbon dioxide concentration in each container taken as in example 1. The results obtained are given in table 2 below.

TABLE 2

| Container No. | 3hr. | 6hr. | 22hr. | 28hr. | 30hr. | 2 days | 5 days |
|---|---|---|---|---|---|---|---|
| Top  1 | 93 | 100 | 100 | 95 | 91 | 89 | 58 |
| 2 | 89 | 100 | 100 | 96 | 91 | 88 | 59 |
| 3 | 100 | 100 | 100 | 100 | 92 | 91 | 56 |
| 4 | 88 | 100 | 100 | 94 | 91 | 88 | 60 |
| 5 | 88 | 100 | 100 | 95 | 92 | 87 | 59 |
| 6 | 93 | 100 | 100 | 95 | 91 | 87 | 60 |
| 7 | 93 | 100 | 100 | 96 | 90 | 88 | 62 |
| Base | | | | | | | |

It will be noted that with solid carbon dioxide added to the top of the stack an atmosphere of 100 percent carbon dioxide was attained in each container within 6hr. The rate of gas loss was slow, 56–62 percent carbon dioxide still being present after 5 days storage at ambient temperature.

EXAMPLE 3

In this test 14 Madeira cakes wrapped in MSAT grade cellulose film were placed in each of containers 2, 3 and 4 and 12 boxes of fondant fancies also wrapped in MSAT grade cellulose film placed in each of containers 5, 6 and 7. As in example 2 approximately 450 g. of solid carbon dioxide was placed in the top perforated container and samples of gas for analysis were withdrawn from both the cakes and the surrounding atmosphere from each container during storage at ambient temperature (18°–21° C.) for 7 days. After 7 days' storage in the containers the cakes were removed from the containers, placed in a fiber board box and examined at regular intervals for mould growth and fermentation. As a control on shelf life, 40 madeira cakes and 30 boxes of fondant fancies were stored at ambient temperature in fiber board boxes and examined regularly for mould and fermentation. The carbon dioxide analysis obtained are shown below in table 3.

TABLE 3

| Container no. | | % $CO_2$ after storage at ambient for (days) | | | | | |
|---|---|---|---|---|---|---|---|
| | | 2 hours | 1 | 2 | 3 | 4 | 7 |
| Top | | | | | | | |
| 1 | Container | 76 | 100 | 100 | 81 | 65 | 46 |
| 2 | Container | 82 | 100 | 100 | 88 | 64 | |
| | cake M | 27 | 100 | 90 | 83 | 69 | 44 |
| 3 | Container | 78 | 100 | 100 | 83 | 64 | 47 |
| | cake M | 34 | 100 | 90 | 81 | 71 | 45 |
| 4 | Container | 69 | 100 | 100 | 83 | 65 | 47 |
| | cake M | 58 | 100 | 89 | 83 | 70 | 48 |
| 5 | Container | 75 | 100 | 100 | 83 | 66 | 48 |
| | cake FF | 55 | 100 | 89 | 84 | 65 | 45 |
| 6 | Container | 70 | 100 | 98 | 84 | 66 | 48 |
| | cake FF | 64 | 100 | 89 | 83 | 67 | 48 |
| 7 | Container | 69 | 100 | 98 | 85 | 70 | 48 |
| Base | cake FF | 62 | 100 | 89 | 83 | 69 | 50 |

M = Madeira
FF = Fondant fancy

An atmosphere of about 100 percent carbon dioxide was achieved both in the cakes and the surrounding atmosphere throughout the stack within 1 day's storage. The rate of carbon dioxide loss was slow and even after 7 days' storage 45–50 percent carbon dioxide was still present. Based on the rate of carbon dioxide loss it can be anticipated that an atmosphere containing above 20 percent of gas should be retained for at least 10 and possibly up to 14 days.

SHELF LIFE TESTS

Mould growth was first noted on the control Madeira cakes 8 days after the date of manufacture. The cakes which were stored in the stack of containers with carbon dioxide for about 8 days first showed mould growth 19 days after the date of manufacture. Thus, the mould free-shelf life was increased by about 11 days which is more than the time which the cakes remained in the carbon dioxide rich atmosphere.

The first signs of deterioration with the control fondant fancies was fermentation of the chocolate fondant which showed bubbles of gas, cracking, and fermentation odor and flavor 14 days after the date of manufacture. Mould growth appeared on the chocolate fondant shortly afterwards, i.e. after 15 days, and was identified as *Sporendonema sebi*. No fermentation was noted in the yellow or pink fancies even after storage for 21 days but mould growth was apparent on the fondant after 18 days' storage. On no occasion was mould noted at the base of the fancies.

With the fondant fancies stored in carbon dioxide no signs of fermentation were visible after 15 days from the date of manufacture but after 18 days the chocolate fondant had become fermented. Thus, the evidence suggests that the fermentation-free shelf life might be increased by 2–3 days by storing in an atmosphere rich in carbon dioxide gas. No mould growth was present on the carbon dioxide treated fancies after storage for 24 days. Although the conditions of storage used would prevent moisture loss, there was no indication that the fondant from either the control or carbon dioxide treated fancies became unacceptably soft or sticky during the storage period.

EXAMPLE 4

Using the stack of trays filled with baked products as for example 3 about 230 g. of solid carbon dioxide was added to the top perforated container in the stack, and readings of the gas present were taken at intervals in both the cakes and surrounding atmosphere in each container. After 16 hours the average carbon dioxide content throughout the stack was 83 percent and this reduced to 72 percent after 23 hours' storage. Based on this test and example 3 it would appear that to obtain an atmosphere of about 100 percent carbon dioxide gas throughout a stack of trays, the amount of solid carbon dioxide added should be about twice as much as that required to fill the stack. Thus, since 450 g. of solid carbon dioxide releases approximately 240 litres of gas, about 370 g. solid carbon dioxide would be required for a stack of trays with an internal capacity of 100 litres.

EXAMPLE 5

In this test an attempt was made to determine the effect of solid carbon dioxide in maintaining cold within the stack of plastic stacking containers. The stack used was the same as that used in previous tests except that one container with perforated base was removed. Four dairy cream filled sponges previously refrigerated at about −1° C. were placed in each tray and temperature recording probes were placed in the filling of one cake per tray. A piece of solid carbon dioxide weighing approximately 900 g. was placed in the top perforated tray on the stack. As a control four cakes were placed on a similar tray exposed to the atmosphere. During the storage period the ambient temperature was about 21° C. The results obtained are given below in table 4.

TABLE 4

| Container no. | | Time in hours for temperature to rise from −1° C. to | |
|---|---|---|---|
| | | 10° C. | 15.6° C. |
| Control | | 1¼ | 2½ |
| Top | 1 | 2¼ | 5¼ |
| | 2 | 2¼ | 5¼ |
| | 3 | 2¼ | 5 |
| | 4 | 2 | 4½ |
| Base | 5 | 1¾ | 3¾ |

It is apparent that the carbon dioxide had a small refrigerating effect in this test. In a similar test with ¾ inch thick expanded polystyrene containers using solid carbon dioxide, it took 17 hours for the temperature of the filling from the cream cakes to rise from 1.7° to 10° C. This shows that the refrigerative effect is more pronounced when the containers are formed of a foamed material.

We claim:

1. A container for foodstuffs which container has upstanding unperforated sidewalls and a perforated base section, nesting means at the top and bottom of the sidewalls whereby the container is nestable with a similar container, the container also being provided with a sealing ring which is located at the top or bottom of the sidewalls in association with one of the said nesting means.

2. A container according to claim 1 which is formed of a thermoplastic material.

3. A container according to claim 2 wherein at least the sidewalls are formed of a foamed thermoplastic material.

4. A container according to claim 2 wherein the thermoplastic material is a copolymer of propylene with ethylene.

5. A container according to claim 1 wherein an upstanding tongue is formed around the top of the sidewalls, a corresponding groove is formed in the base of the sidewalls and the sealing ring is located in the groove.

6. A container according to claim 1 wherein an upstanding tongue is formed around the top of the sidewalls, a corresponding groove is formed in the base of the container, the sidewalls of the container are extended below the base of the container to form a skirt of increased diameter which is adapted to fit over the top of a similar container, and the sealing ring is located in the groove in the base of the container.

7. A container according to claim 1 wherein the sealing ring is formed of a flexible foamed material which is a foamed rubber, a polyether foam or a polyurethane foam.

8. An assembly comprising at least two of the containers claimed in claim 1, wherein the containers are stacked one on the other, an unperforated top cap is located on the top of the uppermost container and an unperforated bottom cap is located at the bottom of the lowermost container, said top and bottom caps being effective to provide a seal at the top and bottom of the stack.

9. An assembly according to claim 8 wherein a preserving atmosphere for foodstuffs is established in the stack.

10. An assembly according to claim 8 wherein solid carbon dioxide is retained in a cage structure which is a snap clip-on fit fixed to the top cap.

* * * * *